(12) United States Patent
Takayama et al.

(10) Patent No.: US 6,243,529 B1
(45) Date of Patent: *Jun. 5, 2001

(54) RECORDING/REPRODUCING APPARATUS CAPABLE OF SYNTHESIZING FRACTIONS OF IMAGE DATA OBTAINED FROM PLURAL READS OF A TRACK

(75) Inventors: Nobutoshi Takayama, Yokohama; Takayuki Kikuchi, Tokyo, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/587,569

(22) Filed: Jan. 17, 1996

Related U.S. Application Data

(63) Continuation of application No. 08/218,379, filed on Mar. 28, 1994, now abandoned.

(30) Foreign Application Priority Data

Mar. 30, 1993 (JP) ................................... 5-095610
Nov. 16, 1993 (JP) ................................... 5-286743

(51) Int. Cl.$^7$ ................................................ H04N 5/783
(52) U.S. Cl. ............................................. 386/68; 386/81
(58) Field of Search ............................... 360/10.1, 10.3, 360/11.1, 38.1, 10.2; 358/312, 313, 314; 386/46, 68, 80, 87, 91, 81, 124, 74

(56) References Cited

U.S. PATENT DOCUMENTS 4,396,954 * 8/1983 Sonoda et al. .......................... 386/74
4,403,260 * 9/1983 Kawamura et al. ..................... 386/80
4,511,931 * 4/1985 Bixby ...................................... 386/80
4,742,519 * 5/1988 Abe et al. ............................... 386/50
4,774,598 * 9/1988 Sekiya et al. ..................... 360/10.3 X
4,796,123 * 1/1989 Takeuchi et al. ................. 360/10.3 X
5,060,077 * 10/1991 Koya et al. ....................... 360/10.1 X
5,239,421 * 8/1993 Hamaguchi et al. ............ 360/11.1 X
5,483,389   1/1996 Karasawa ................................ 360/53

* cited by examiner

*Primary Examiner*—Huy Nguyen
(74) *Attorney, Agent, or Firm*—Fitzpatrick, Cella, Harper & Scinto

(57) ABSTRACT

Information recording/reproducing apparatus such as a VTR records and reproduces information such as image information in and from a recording medium such as a magnetic tape. The apparatus has a tape feeding device which can feed the tape selectively at a first speed which is the same as the tape speed during recording and a second speed which is, for example, 1/2 the first speed. In a slow-speed reproducing mode of the apparatus, the tape is fed intermittently such that a phase in which the tape is fed at the second speed and a phase in which the tape is held still appear alternately. During the running of the tape at the low second speed, a predetermined region, e.g. a track, is traced by reproducing heads a plurality of times in an overlapping manner, so that fractions of data stored in the track are reproduced by the reproducing heads. These data fractions are reassembled within a memory based on address data contained in the reproduced data fractions, so that a video output is synthesized in the memory. With this arrangement, data can be obtained from almost the entire area of each track, so that slow-speed reproduction can be conducted with improved quality of the reproduced image.

25 Claims, 14 Drawing Sheets

FIG. 1(a)
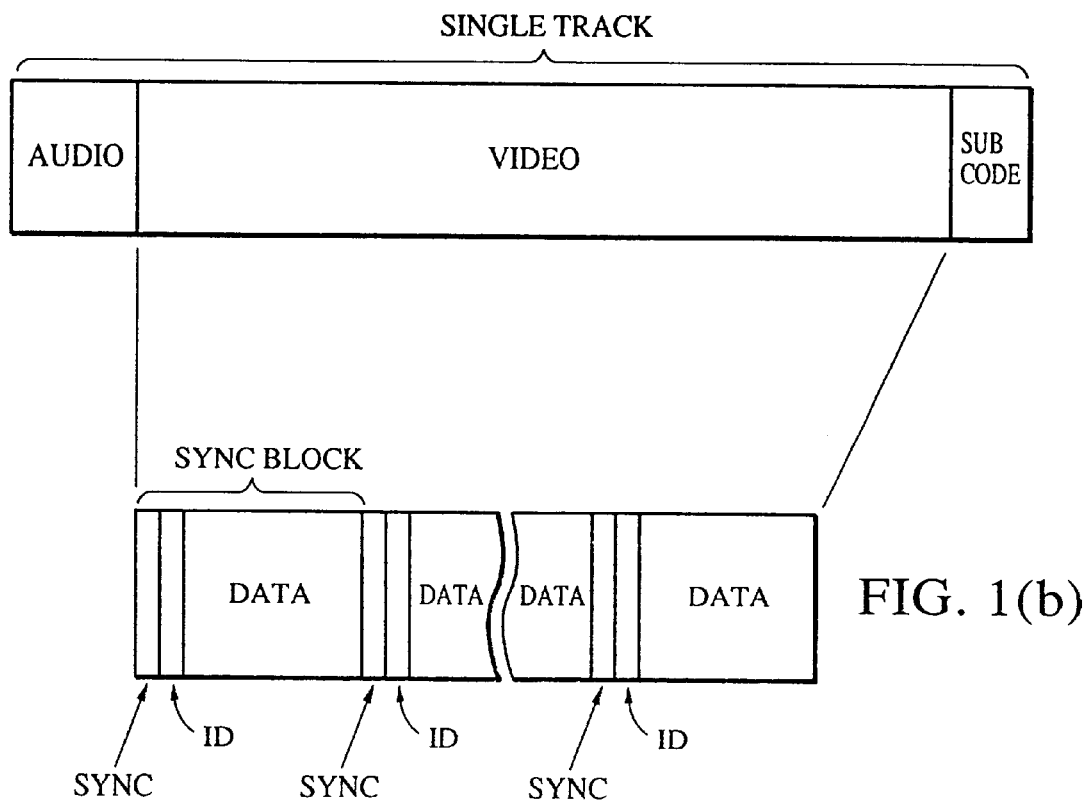
FIG. 1(b)
FIG. 1(c)
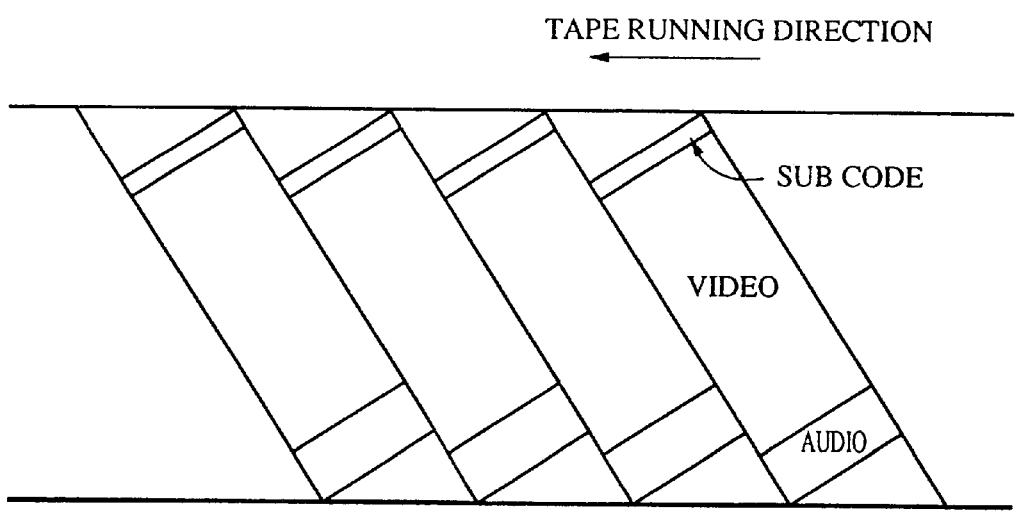

HEAD TRACE IN REVERSE SLOW (1/3) SPEED REPRODUCTION

HEAD TRACE DURING FORWARD SLOW (1/3) SPEED REPRODUCTION

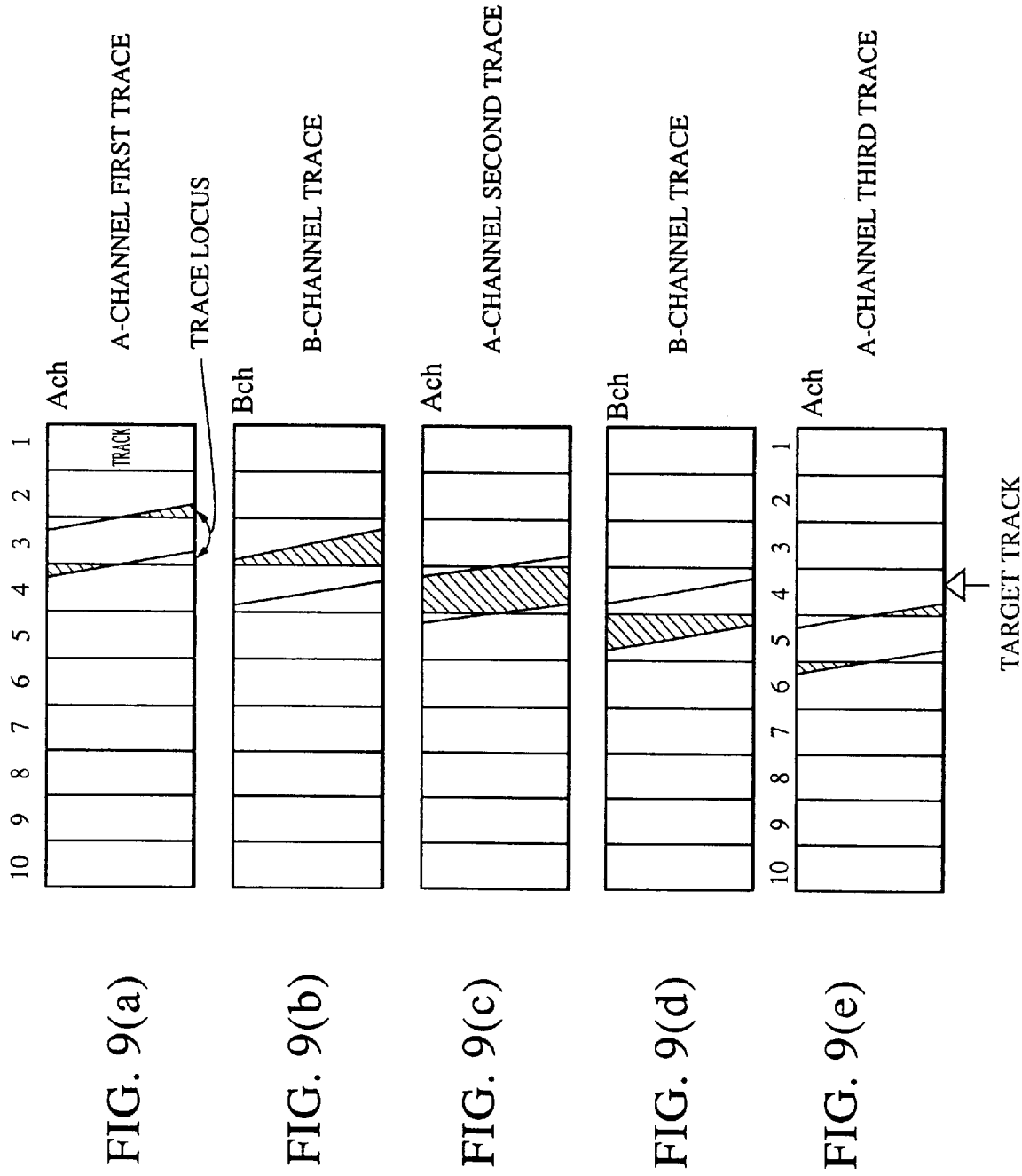

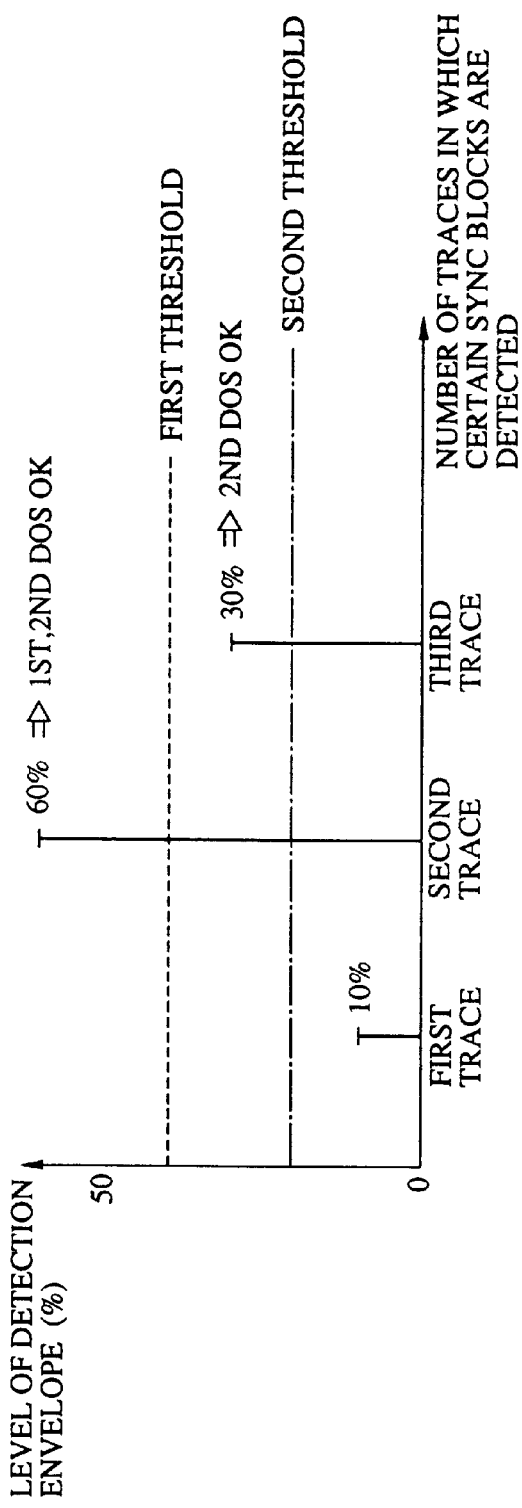
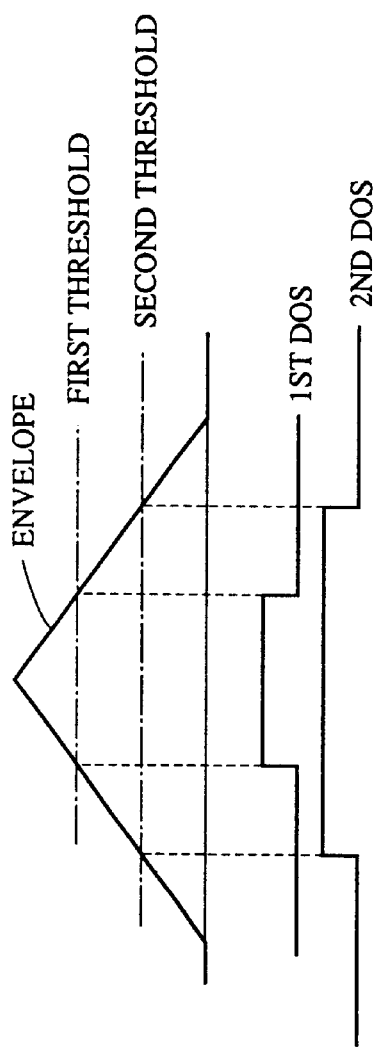

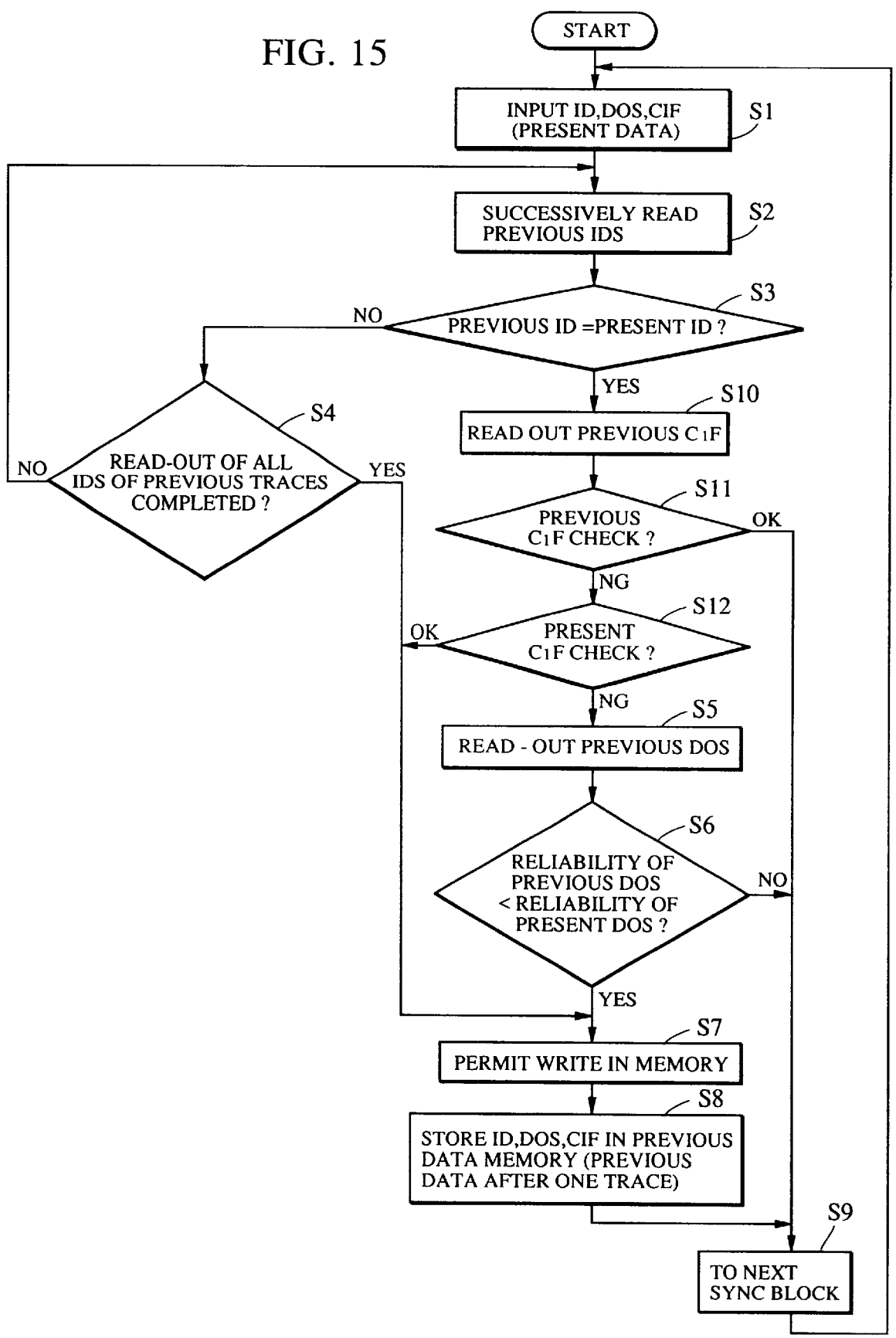

RECORDING/REPRODUCING APPARATUS CAPABLE OF SYNTHESIZING FRACTIONS OF IMAGE DATA OBTAINED FROM PLURAL READS OF A TRACK

This application is a continuation, of application Ser. No. 08/218,379 filed Mar. 28, 1994, now abandoned.

BACKGROUND OF THE INVENTION

1. Field of the Invention

The present invention relates to a recording and/or reproducing apparatus for recording and/or reproducing signals on and/or from a recording medium and, more particularly, to a recording and/or reproducing apparatus in which reproducing characteristics are improved particularly in a slow-speed reproducing mode in which the recorded signals are reproduced from the recording medium running at an average speed lower than in the recording mode.

2. Description of the Related Art

Rotary head type magnetic recording/reproducing apparatuses of the type mentioned above have a slow-speed reproducing mode in which signals are reproduced from a recording medium, e.g., a magnetic tape, running at an average speed lower than the running speed of the medium in the recording mode. In general, there are two types of methods which realize such a slow-speed reproducing mode. In one of these methods, the desired low tape running speed is attained by intermittently feeding the tape, i.e., by alternately employing a period in which the tape is fed at the same speed as that in the recording mode and a period in which the tape is held still. The other method, generally referred to as the "dynamic tracking mode", employs an actuator to a free end of which is fixed a head carried by a rotary drum. The actuator displaces the head in a direction which intersects the direction of rotation of the rotary drum, so that reproduction is conducted with high degree of tacking precision from the tape which runs at a constant speed lower than the speed in the recording mode.

With the first-mentioned slow-speed reproducing mode, however, it is difficult to pick-up signals from the whole track width throughout the period of the slow-speed reproduction, because of a lack of precision in the tape feed control. Consequently, noise is produced during slow-speed reproduction or, alternatively, an additional head for exclusive use in slow-speed reproduction has to be employed.

Furthermore, in a reverse slow-speed reproduction mode in which the tape is fed in a direction reverse to that for recording, reproduction cannot be conducted satisfactorily even when an exclusive slow-speed reproducing head is used, because the head trace angle largely differs from the track angle.

The second-mentioned slow-speed reproducing method, i.e., the "dynamic tracking", requires complicated mechanisms and control in order to achieve the dynamic tracking function, resulting in increased costs of production. In addition, it is not easy to precisely control the feeding of the tape at the reduced speed.

The current trend towards the use of digital signals applies also to the field of VTRS, and digital VTRs have been proposed in line with this trend. In such a digital VTR, as shown in FIGS. 1(a) and 1(b), image signals for one frame are divided into plural blocks. Each block, generally referred to as sync block, is composed of image data, a sync signal for enabling digital demodulation, and an ID signal which comprises position information indicative of the position of the block in the frame. The sync blocks are then recorded in a tape in a manner shown in FIG. 1(c). Although not illustrated in detail in FIGS. 1(a) and 1(b), the audio signal has a construction similar to that of the video signal.

In most cases, reproduction is conducted by reproducing the data of the blocks through digital demodulation, recombining the reproduced data in a frame memory based on the ID signals to form the image information on a frame basis, and then outputting the information of the successive frames.

In the digital VTR, the image is output through a memory, rather than by directly forming output signals in real time from the RF signals reproduced through the head tracking operation.

The present inventors have found that this feature of the digital VTR allows the operation of a superior and novel slow-speed reproducing function different from those of the known arts.

SUMMARY OF THE INVENTION

An object of the present invention is to provide a recording/reproducing apparatus which realizes the above-mentioned novel slow-speed reproducing function.

According to one aspect of the present invention, there is provided an information recording/reproducing apparatus which includes structure for effecting a desired special reproduction mode by feeding a recording medium such as a tape at a speed lower than that in a recording mode so as to obtain a plurality of blocks of reproduced image data from a preselected region, e.g., a track, of the recording medium. There is also provided structure for synthesizing the image by reassembling the reproduced image data on block basis in accordance with address information contained in the blocks of the reproduced data, whereby a specific reproduction (such as slow-speed reproduction) can be conducted with improved quality of the reproduced image.

According to another aspect of the present invention, a recording/reproducing apparatus for (i) recording in a recording mode and/or (ii) reproducing mode information to and/or from a recording medium which stores information and address data comprises a recording medium moving means for moving, in the reproducing mode, the recording medium at a speed which is slower than a speed at which the recording medium is moved in the recording mode. Synthesizing means are provide for reproducing, a plurality of times, information recorded in a predetermined region of the recording medium to obtain a plurality of portions of reproduced data. The synthesizing means synthesizes the portions of reproduced data by using the address data contained in the information recorded in the recording medium in order to provide synthesized reproduced information.

According to a further aspect of the present invention, a reproducing apparatus for reproducing information recorded in a recording medium which stores information and address data includes recording medium moving means for moving the recording medium selectively at one of (i) a first speed and a (ii) second speed which is slower than the first speed. Synthesizing means are provided for reproducing, a plurality of times, information recorded in a predetermined region of the recording medium to obtain a plurality of portions of reproduced data. The synthesizing means synthesizes the portions of reproduced data by using the address data contained in the information recorded in the recording medium to provide synthesized reproduced information.

According to yet another aspect of the present invention, a reproducing apparatus for reproducing information recorded in a recording medium comprises reproducing means for reproducing information recorded in a predetermined region of the recording medium, and storage means for storing the reproduced information produced by the reproducing means. Signal generating mans are provided which, in a mode in which reproduction from the predetermined region is conducted a plurality of times, generates a plurality of signals indicative of predetermined states of the reproduced information produced by the reproducing means over the plurality of times of reproduction. Comparator means are provided for comparing the plurality of signals generated by the signal generating means with one another. Finally, control means are provided for controlling the storage of the reproduced information in the storage means in accordance with the result of the comparison performed by said comparator means.

The above and other objects, features and advantages of the present invention will become clear from the following description of the preferred embodiments when the same is read in conjunction with the accompanying drawings.

BRIEF DESCRIPTION OF THE DRAWINGS

FIGS. 1(a) and 1(b) are illustrations of the construction of data n track;

FIG. 1(c) is an illustration of a manner in which data of blocks of a frame are recorded in a tape;

FIGS. 9(a) through 9(e) are illustrations of the head tracking operation in a slow-speed reproduction mode;

FIGS. 12(a) and 12(b) are a characteristic diagram and a waveform chart illustrative of the operation of the apparatus shown in FIG. 11;

FIG. 15 is a flow chart illustrative of slow-speed reproducing operation of the apparatus shown in FIG. 14.

DESCRIPTION OF THE PREFERRED EMBODIMENTS

Figure 2A:
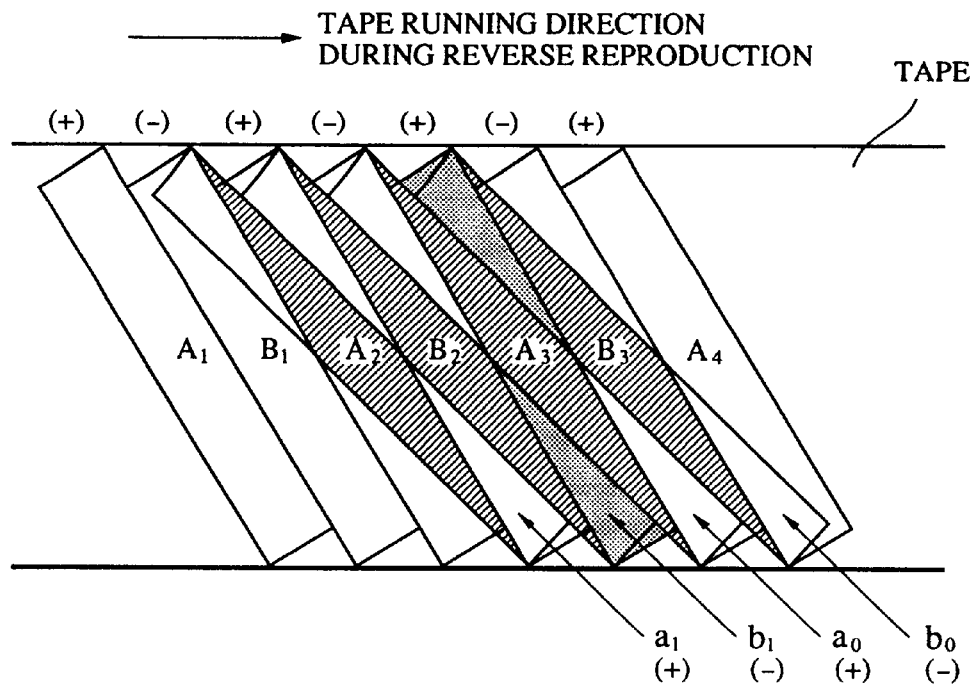
FIG. 2(a) is an illustration of head tracking operation performed by a known apparatus in a reversing reproduction mode in which a tape is made to run in a direction reverse to that in a recording, but at the same speed as in the recording.

A description will be given first of the principles of the present invention, prior to the detailed description of the embodiments. FIG. 2(a) is an illustration of loci ($b_0$, $a_0$, $b_1$, $a_1$) of the head trace operation in ordinary reverse reproduction carried out at the same tape running speed as in recording. The tape speed equal to that in the recording operation will be referred to as "1/1 speed" hereinafter. As well known to those skilled in the art, the hatched areas in FIG. 2(a) show the track regions from which reproduced RF output is obtained in reversing reproduction at 1/1 tape running speed. In each track, e.g., the track $A_3$, the reproducible area, i.e., the striped area, from which signals are reproduced by a head of a given azimuth is about half the total area of this track $A_3$, if the width of the head is substantially equal to that of the track. Thus, information in the remaining dotted area cannot be reproduced. It is also known that there is a practical limit in the improvement in the reproduction ratio (ratio of the striped area to the total area of the track) by widening the head, although the use of a head having a greater width can increase this ratio to a certain extent.

The aforementioned conventional reversing slow-speed reproducing method, which employs alternating running and stopping phases of the tape to obtain the desired reduced average speed, cannot provide high quality of the reproduced information because the tape runs at the 1/1 speed in the running phase to provide only a small reproduction ratio as is the case of the striped area in the track $A_3$ shown in FIG. 2(a).

Figure 2B:
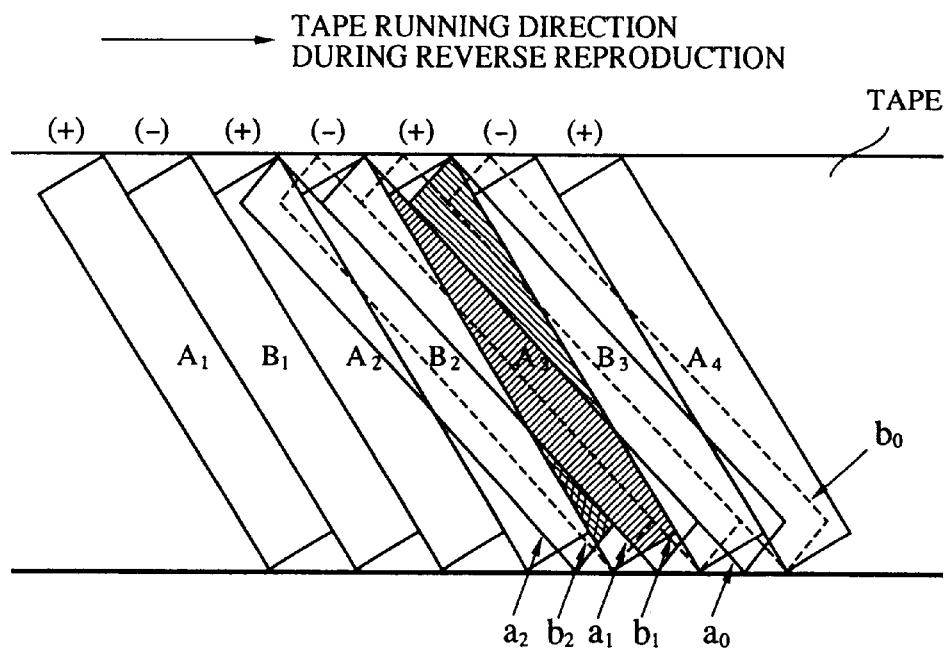
FIG. 2(b) is an illustration of head tracking operation performed by an apparatus of the present invention in a reversing reproduction mode in which a tape is made to run in a direction reverse to that in a recording, but at the same speed as in the recording.

FIG. 2(b) shows the loci ($b_0$, $a_0$, $b_1$, $a_1$, $b_2$, $a_2$) obtained in the second-mentioned known method, i.e., in reversing reproduction from a tape continuously running in the reverse direction at a reduced speed, e.g., 1/2 that of the tape running speed in the recording operation. This tape speed will be refereed to as "1/2 tape speed", hereinafter. Head traces "a" are shown by solid lines, while the head traces "b" are shown by broken lines. Referring specifically to the track $A_3$, it will be understood that signals can be reproduced from the two areas shown by striped lines in respectively different directions by the head traces $a_0$, $a_1$, $a_2$ of a given azimuth. More specifically, in this method, the heads of (+) azimuth and (−) azimuth are allowed to trace each track by virtue of the tape speed reduced to 1/2. It is thus possible to trace each tracks two or more times by the heads of the same azimuth regardless of the tracking phase, provided that the head width is determined to be not smaller than the pitch (period) of the track.

It is therefore possible to pick up almost all of the information contained in each track by recombining, in a memory, the fractions of image information obtained through plural traces (at least twice) of each track.

A description will now be given of an embodiment of the present invention which, based upon the above-described principles, realizes slow-speed reproduction at any slow speed by an intermittent running of the tape including a stop phase and a 1/2 speed running phase.

In contrast to a conventional analog VTR in which information of one frame is recorded in a couple of tracks, a digital VTR usually employs a multiplicity of tracks, e.g., 10 tracks, for recording a large amount of image information contained in one frame. The following description of a digital VTR, however, is based on an assumption that two tracks are used for recording the image information of one track, for the purpose of simplification of the explanation.

Figure 3:
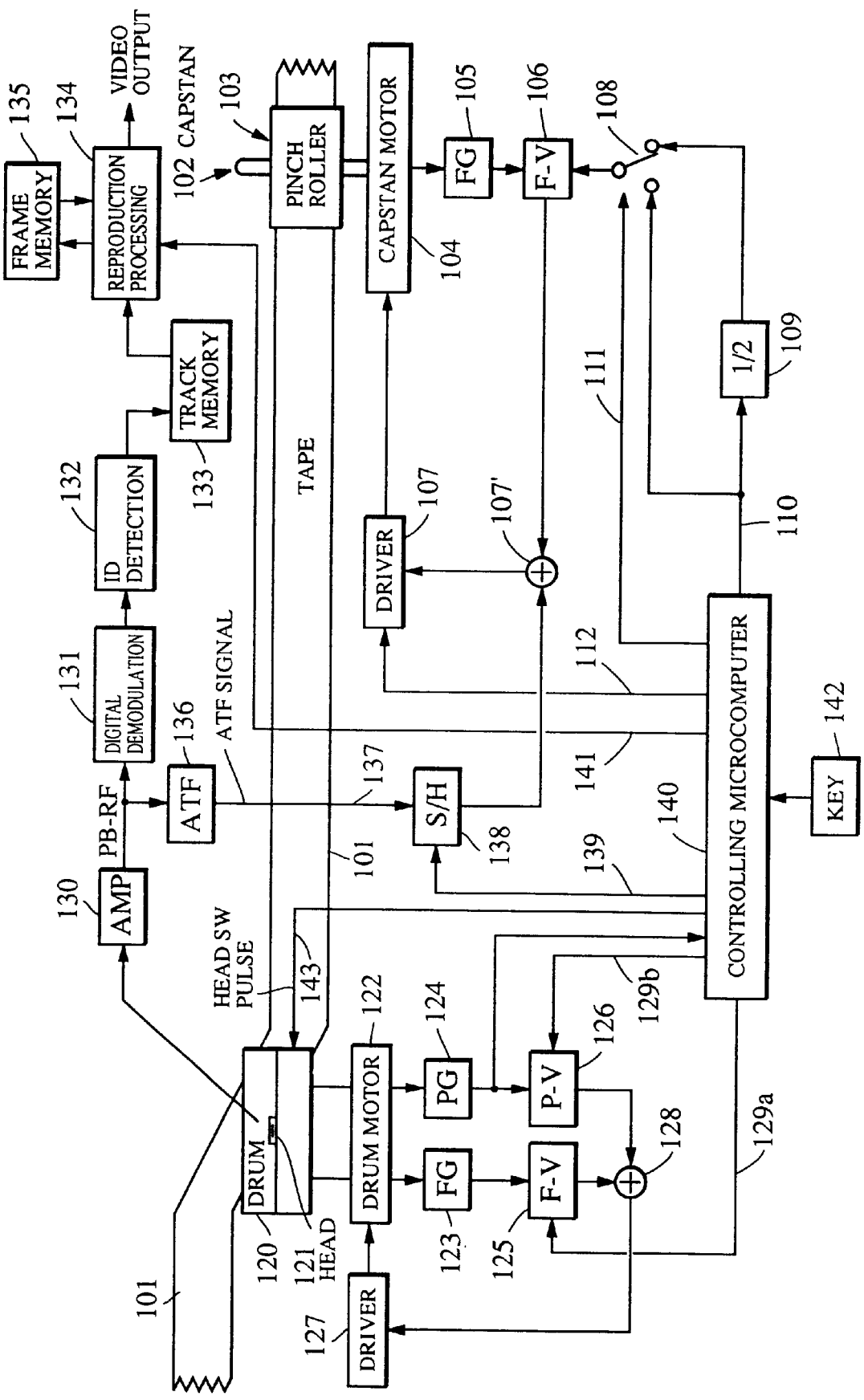
FIG. 3 is a block diagram of a reproduction system in a VTR embodying the present invention.

FIG. 3 is a block diagram of a portion of a 2-head type digital VTR as an embodiment of the invention, showing particularly a controller for controlling a drum motor and a capstan motor, as well as the flow of signal processing during reproduction.

Referring to FIG. 3, a tape 101 as the recording medium is pinched between a capstan shaft 102 and a pinch roller 103 which cooperate with each other to feed the tape 101. Numeral 104 denotes a capstan motor, while 105 denotes a frequency generator (referred to as "FG") which produces pulses in accordance with the speed of rotation of the capstan shaft 102. A speed judging circuit 106 compares the rotation speed of the capstan shaft 102 (in terms of the FG pulses from the FG 105) with a command speed. A driver circuit 107 drives the capstan motor 104. A switching circuit (referred to as "SW") 108 is provided for the purpose of selecting the command speed signal which is to be supplied to the speed judging circuit 106. Numeral 109 designates a 1/2 frequency dividing circuit. A command speed signal for instructing the speed judging circuit 106 through the SW circuit 108 is denoted by 110. Numeral 111 designates a signal for controlling the SW circuit 108, while 112 denotes a signal which gives to the driver circuit 107 instructions concerning turning on and off of the electrical power supply to the capstan motor and the direction of rotation of the capstan motor shaft.

A rotary drum 120, which is driven by a drum motor 122, has a plurality of heads 121. The speed of rotation of the drum is detected by an FG 123 which produces pulses of a frequency corresponding to the rotation speed. A pulse generator (referred to as "PG") 124 generates pulses indicative of the direction of rotation of the drum 120. Numeral 125 denotes a speed judging circuit, 128 denotes a phase judging circuit and 127 denotes a drum motor driver circuit. A command rotation speed signal and a command rotation phase signal are respectively denoted by 129a and 129b.

An amplifier 130 amplifies the RF signal reproduced by the heads 121 so as to produce an output PB-RF. A digital demodulator 131 performs digital detection from the PB-RF signal to effect error correction. Numeral 132 denotes an address information (ID) detecting circuit which detects, from the demodulated data, the ID information which is attached to each of the successive blocks. A track memory 133 holds, at a time, reproduced data corresponding to four tracks. A reproduction processing circuit 134 decodes the data obtained from the track memory 133 on a track basis, and recombines the decoded data to form image information corresponding to each of the successive frames within a frame memory 135 as the video memory. The circuit 134 then delivers the thus-formed video information on a frame basis to provide a video output.

The above-mentioned frame memory 135 synthesizes the image of one frame from the data obtained from the track memory 133. The content of the frame memory 135 is successively read on frame basis so as to form the video output.

A tracking signal generating circuit 136 (referred to a "ATF circuit") produces a tracking error signal (ATF signal) 137 from the PB-RF signal produced by the amplifier 130. A sample hold circuit 138 samples and holds the ATF signal 137. The sample hold circuit 138 is controlled in accordance with a timing signal 139 corresponding to the mode of the reproducing operation of the VTR, so as to attain good tracking conditions by control of the driver 107 through adder 107'.

A system control microcomputer 140 produces various control signals necessary for realizing good reproduction. Numeral 141 denotes a signal for controlling the operation of the reproduction processing circuit 134 to enable the latter to read data from the frame memory 135 in accordance with the mode of operation of the VTR. Numeral 143 denotes a head switching pulse which enables selection of one of the heads 121 in accordance with the rotational phase of the rotary drum 121.

A key device 142 enables selection of a desired reproduction mode. For instance, forward or reverse 1/3 speed reproduction, PLAY, SEARCH and other basic operation modes are selectable.

Figure 4:
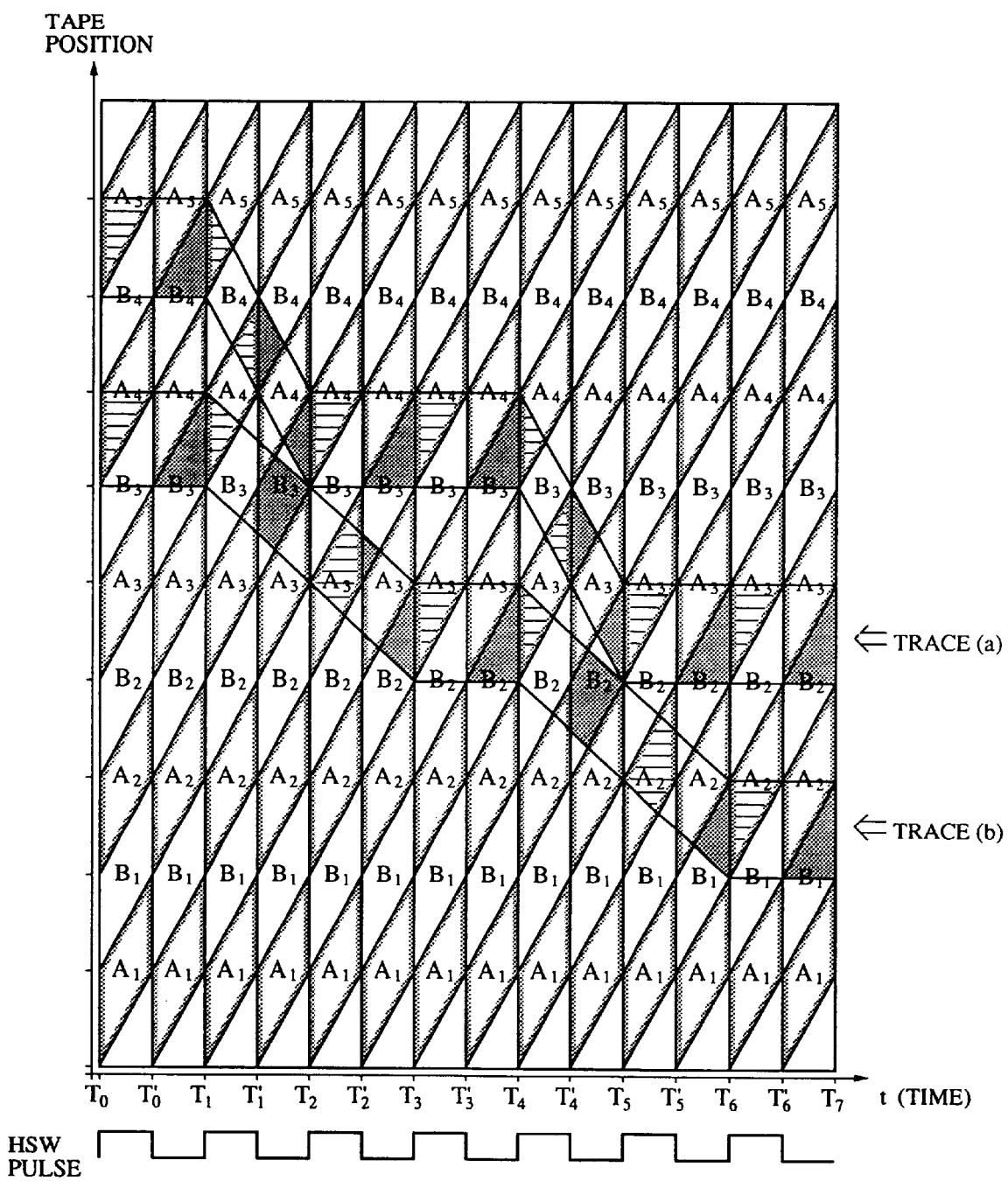
FIG. 4 is an illustration of head trace pattern in reversing 1/3 speed mode as compared with that of a conventional apparatus.
Figure 5A:
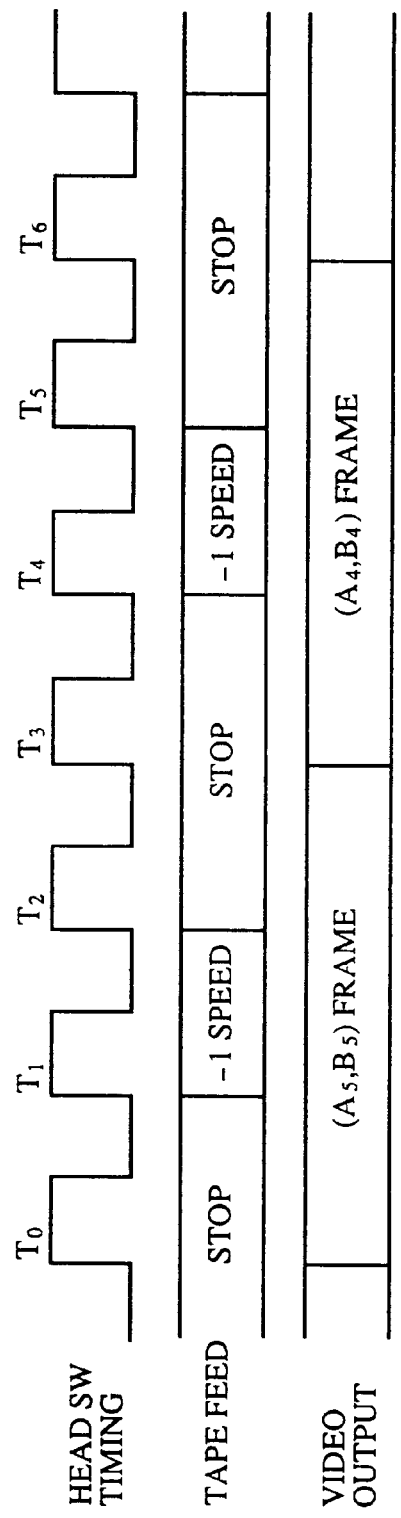
FIGS. 5(a) and 5(b) are timing charts of video signals corresponding to the head trace patterns (a) and (b) in FIG. 4.
Figure 5B:
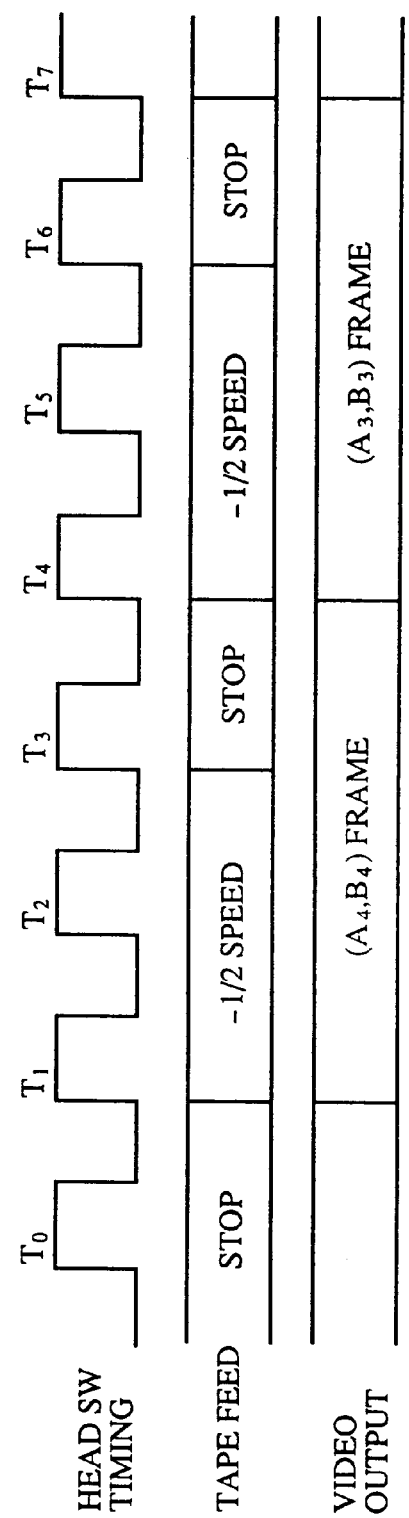

FIG. 4 is an illustration of the head trace performed by an opposing 1-channel 2-head type VTR in reverse 1/3 slow-speed reproducing mode. More specifically, in FIG. 4, the "trace (a)" shows the head trace which is performed in the conventional intermittent tape feed method in which the tape runs at the 1 speed in the running phase, while the "trace (b)" is the head trace performed in accordance with the present invention in which the tape runs at 1/2 speed in the running phase of the intermittent tape feed. FIGS. 5(a) and 5(b) are charts showing the relationship between the video signals produced as a result of the head traces shown in FIG. 4 and the timings of the head trace and the tape feed. More specifically, FIG. 5(a) shows the above-mentioned relationship corresponding to the trace (a) of FIG. 4, i.e., the known head trace, while FIG. 5(b) shows the relationship corresponding to the trace (b) of FIG. 4, i.e., the head trace performed in accordance with the present invention.

A description will now be given of the reversing 1/3 slow-speed reproducing operation in the embodiment of the present invention, with reference to FIGS. 3, 4 and 5(a), 5(b). In the following description, a minus sign (−) indicates that the tape runs in the reverse direction. Thus, −1/3 speed indicates that the tape runs in the reverse direction at a speed which is 1/3 the speed of the tape during recording.

Referring to FIG. 3, the key device 142 is operated to select the −1/3 slow-speed reproduction mode. As a result, the drum 120 is started under speed and phase controls which are conducted in exactly the same manner as those in the ordinary PLAY mode. However, the command rotation speed signal commanding the rotation speed of the capstan shaft 102 is reduced to 1/2 by the frequency divider 109 in synchronization with the drum rotation, and the demultiplied command signal is supplied through the SW circuit 108 to the speed judging circuit 106, whereby the command speed of the capstan is set to a speed which is 1/2 the tape speed of the recording mode. At the same time, the control signal 112 instructs the driver circuit 107 to reverse the tape, i.e., to feed the tape in the direction reverse to that of the recording mode. Meanwhile, the control microcomputer generates, in synchronism with the drum rotation, capstan on/off pulses provided in control signal 112 of a duration corresponding to the period of two frames. The capstan shaft 102 therefore rotates in the reverse direction at 1/2 speed for a period corresponding to the period of two frames, thereby feeding the tape at this reduced speed. This operation corresponds to the portion of the head trace (b) in FIG. 4 between a moment $T_1$ and a moment $T_3$. Furthermore, the head trace operation is conducted in the periods in which the tape does not run, i.e., the period between a moments $T_0'$ and $T_1$ and the period between the moments $T_3$ and $T_3'$, whereby reproduced RF corresponding to the frame formed by the tracks $A_3$ and $B_3$ (frame ($A_3$, $B_3$))is obtained. The reproduced RF thus obtained is reassembled in the track memory 133 shown in FIG. 3 in accordance with the address information, whereby almost a full track of information is synthesized and sent to the reproduction processing circuit 134.

Then, the frame ($A_3$, $B_3$) is obtained as the video output in a period between moments $T_4$ and $T_7$ as shown in FIG. 5(b), and is held in the frame memory 135 shown in FIG. 3.

In the period between the moments $T_3$ and $T_4$, the capstan on/off pulse is held off so that the tape does not run. It is possible to obtain a desired average slow tape speed in the slow-speed reproduction, by suitably setting the duration of this period. In the illustrated embodiment, the tape is fed by an amount corresponding to one frame within a period corresponding to three frames, whereby the 1/3 speed is attained as the average slow speed for slow-speed reproduction. Attention should be drawn to the trace (b) in FIG. 4, particularly to that in the period between the moments $T_0'$ and $T_3'$. It will be seen that each of the tracks $A_3$, $B_3$ is traced three times, whereby the signals are reproduced from the whole area of each track.

It is possible to attain the −1/3 slow-speed reproduction with good quality of the reproduction output, by repeating the above-described operation. According to the described method, the reproduction ratio is not significantly affected by the state of tracking during the tape running. The described embodiment, however, conducts a tracking control by employing the ATF signal, in order to precisely control the amount of feed of the tape on a frame basis.

Figure 6:
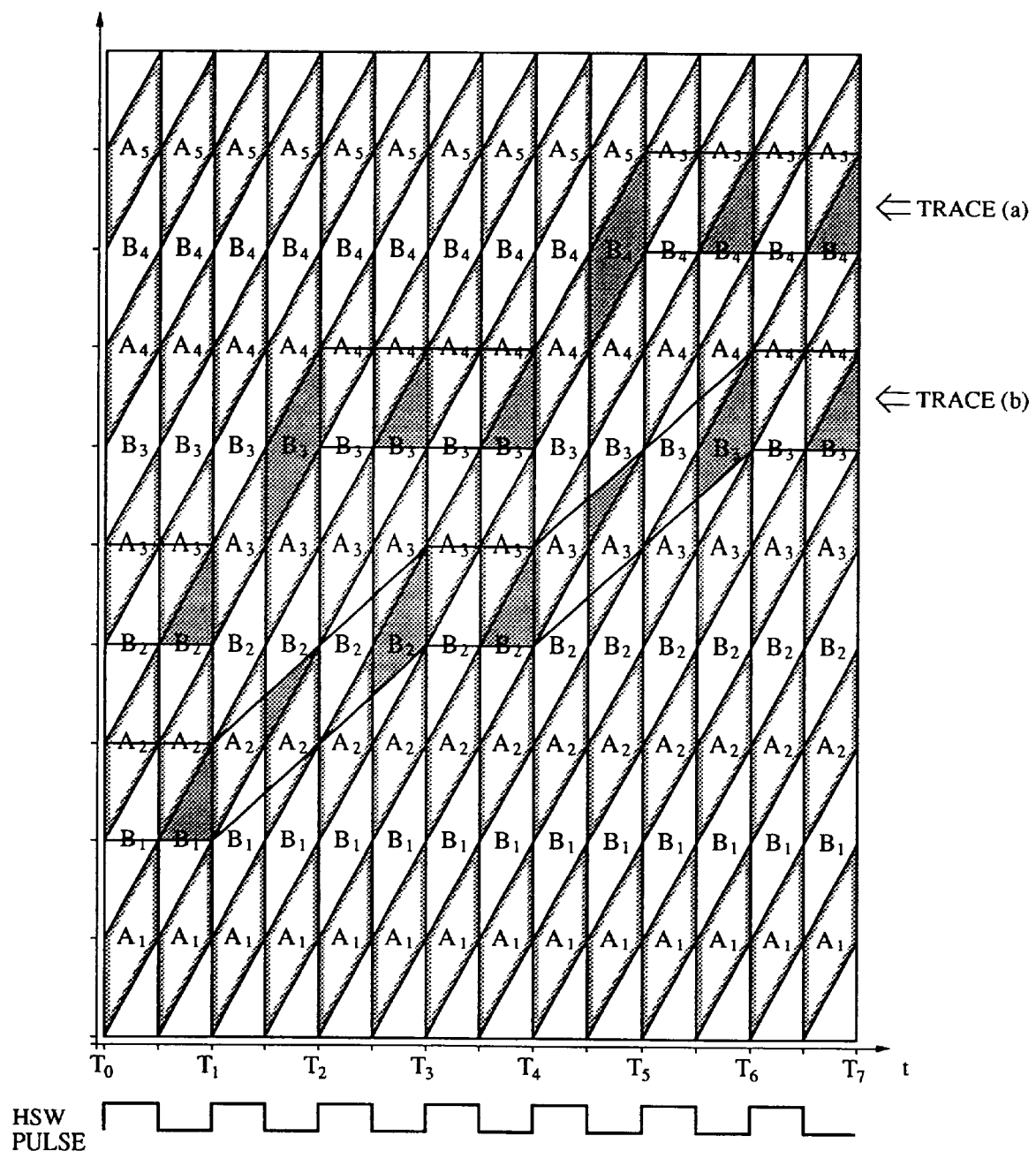
FIG. 6 is an illustration of head trace pattern in forward 1/3 speed mode as compared with that of a conventional apparatus.

FIG. 6 illustrates, similar to FIG. 4, the head trace in forward 1/3 slow-speed reproduction mode of the VTR embodying the present invention (trace (b)) in comparison with the head trace (a) which is performed in accordance with the known technique. It will be seen that the entire area of the track is traced by two cycles of tracking conducted in the period between moments $T_1$ and $T_2$ in which the tape is being fed. In the forwarding reproduction, head tracking is executed in good manner even by the conventional technique which relies upon intermittent tape feed including a tape running phase of 1/1 speed. However, the slow-speed reproduction method of the described embodiment, which employs intermittent tape feed including a tape running phase at 1/2 speed, provides a better effect, considering the degradation of tracking at the moments of stop and start of the capstan and inferior precision of the tape stop position control which are experienced when the conventional technique is used.

Thus, the slow-speed reproduction of the described embodiment, relying upon 1/2 speed intermittent tape feed, provides superior reproduction characteristics when combined with the memory circuit of the reproduction processing system, thus offering a very useful slow-speed reproduction function for digital VTRs regardless of the direction of running of the tape.

Although the foregoing description of the embodiment is based on an assumption that the image of one frame is recorded in two tracks, this is only illustrative and the described embodiment can be applied to cases where many tracks, e.g., 10 tracks, are used to record the image of one frame. Such an improvement can be obtained by setting the tape feed speed in the tape running phase of the intermittent feed to 1/N (N being the number of tracks), instead of 1/2 employed in the described embodiment, so as to attain any desired slow speed.

Although a 2-head type VTR is specifically mentioned in the foregoing description, this is only illustrative and the invention does not pose any restriction on the number of the heads and the number of the tracks employed.

It is also to be understood that the drum servo circuit and the capstan servo circuit can be realized by software in the microcomputer, although they are presented by hardware in the described embodiment.

It will also be clear that the stop position control can be performed using a suitable tracking means, although ATF (auto-tracking-finding) control is specifically mentioned in the foregoing description.

Furthermore, the continuous feed of the tape is not essential, and the invention can be applied also to the cases where the tape is made to run continuously.

It is also to be understood that the invention is applicable not only to the slow-speed reproduction but also to frame-thinning reproduction, i.e., a reproduction mode in which the image is reproduced every predetermined number of frames, both in the forward and reverse tape running directions.

Thus, the described embodiment provides superior quality of the reproduced image in slow-speed reproduction mode, by virtue of the combination of the tape feed means which can feed the tape at a speed lower than that in the recording mode and synthesizing means for synthesizing, in a memory, frame image information from the data reproduced through plural tracing on each track, using address data contained in these reproduced data.

In addition, the described embodiment offers an advantage in that the position of stopping the tape during intermittent feed is more precise and more easily controlled as compared with the known technique, because the tape running speed during the intermittent running is lower than that in the known technique which employs a tape running phase at the 1/1 speed.

A description will now be given of another improvement of the described embodiment.

In the described digital VTR, the video signal is formed into blocks each having a predetermined number of pixels and, after an orthogonal transformation such as discrete cosine transformation (DCT), quantizing/entropy encoding is effected on the coefficients after the transformation, thereby recording the image information. In a VTR using variable-length codes, it is desirable that an equal or constant quantity of codes is used in block groups each having a predetermined number of blocks, in view of the necessity for special reproduction and the risk of error propagation. To this end, the quantity of codes is regulated by adjusting the quantizing parameter of the data which is to be coded by variable-length code.

Figure 7:
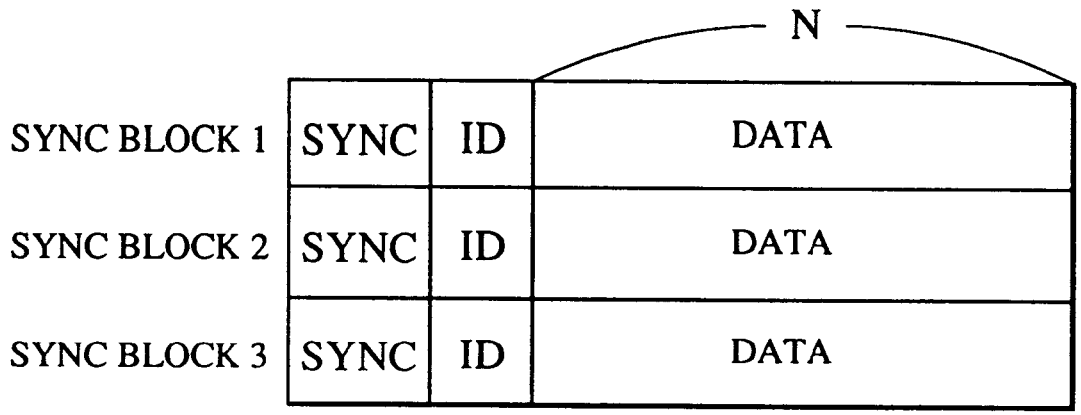
FIG. 7 is an illustration of data format of a sync block.
Figure 10:
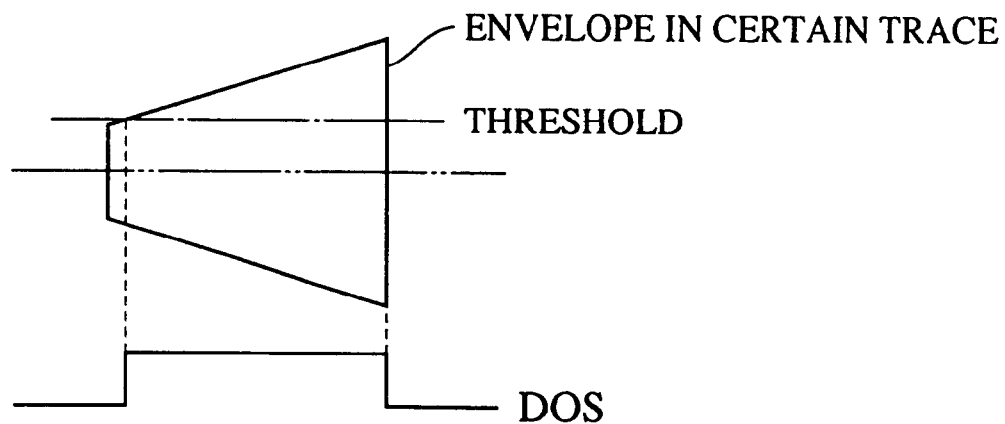
FIG. 10 is a waveform chart illustrative of a method for obtaining a drop-out signal.
Figure 8:
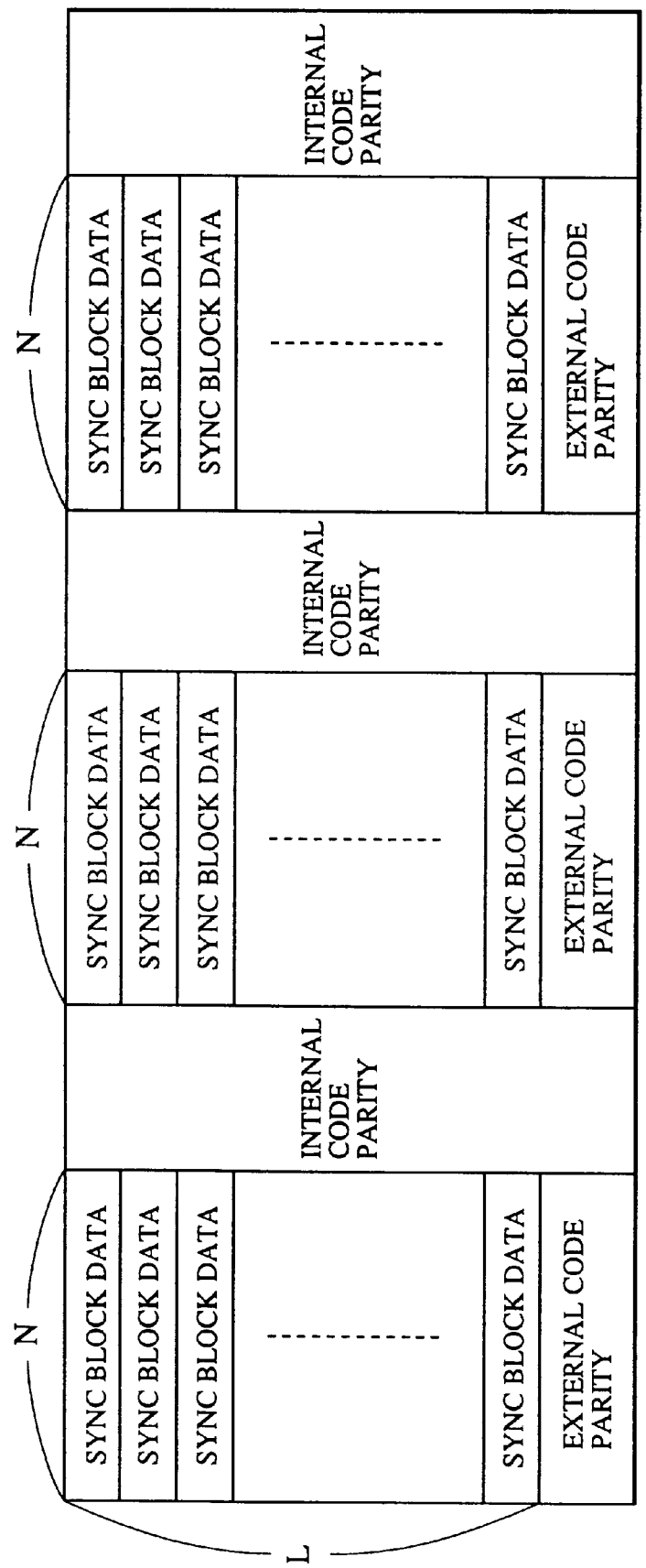
FIG. 8 is an illustration of a manner in which code length is fixed for every predetermined number of sync blocks.

FIG. 7 shows an example of a data format of sync blocks obtained through adjustment of the code quantity by the method described above using DCT equivalent to that shown in FIGS. 1(a) and 1(b). In this case, the code length is fixed for every M sync blocks, e.g., three sync blocks. As stated before, each sync block is headed by a synchronizing signal (SYNC) and additional information (ID). The three sync blocks contain a plurality of blocks each having the above-mentioned predetermined number of pixels. The data thus formed into sync blocks is recorded in a magnetic tape after being provided with error correction coding which in this case is product code RS (Reed Solomon) code. Symbol L indicates the number of sync blocks corresponding to one track.

A description will be given of the decoding operation in the slow-speed reproduction.

During the slow-speed reproduction, reproducing heads perform tracking in an overlapping manner on each recording track, as shown in FIGS. 9(a) through 9(e). More specifically, FIGS. 9(a) through 9(e) are illustrations of the relationship between recording tracks and head tracking as obtained with an opposing-head 1-channel type VTR. It will be seen that a target track, e.g., No. 4 track, is traced three times by the A-channel head. Thus, the data of a target track is detected by plural traces. The slow-speed reproduction data detected by the reproducing heads is divided into the ID information and the image or video data. At the same time, the amplitude level (referred to as "envelope level") of the reproduced data is judged for each sync block with reference to a certain threshold level and a drop-out signal (referred to as "DOS") is produced for each sync block in accordance with the result of the judgment. The drop-out signal DOS is a signal indicative of the reliability of the state of reproduction of each data. This signal is used in an ordinary reproducing operation for the purpose of reduction in the envelope level due to, for example, a defect in the magnetic tape. In contrast, in slow-speed reproduction, detection of data of a single sync block is performed through plural traces which provide envelope levels different from one another and lower than that in the ordinary reproduction. During the slow-speed reproduction, therefore, the threshold level for generation of the DOS is set to be lower than that used in ordinary reproduction, so that all the data acquired from the same sync block are written at least once in the memory.

Error correction processing using internal code is effected on the reproduced image data. Thus, corrected image data is produced together with a flag $C_1F$ which is indicative of whether or not the image data contains an error. The flag $C_1F$, image data, and ID information are written in a memory using a control which is executed in accordance with the DOS. Namely, if the DOS is an OK signal which indicates that the reliability of the data is high, the writing in the memory is permitted, whereas, when the DOS is an NG signal indicative of unacceptably low reliability, writing in the memory is prohibited. In this case, a RAM is used as the memory, and appointment of the address is conducted in accordance with the ID information which includes information concerning the display position in the frame. Thus, data fractions obtained repeatedly from the same sync block through repeated traces are over-written in the memory, provided that the DOS of such a data fraction is OK. The image data stored in the memory are read and subjected to an error correction processing which is conducted by using external code, similar to the error correction by internal code. The data thus corrected are written again in the memory. When the error correction decoding is finished on all the data, the memory contains the data after the correction. The correcting decoding operation is finished by outputting the data from the memory.

In the reproduction method described above, the threshold level for the generation of the DOS in the slow-speed reproduction mode is set to a level below that in the ordinary reproduction, so that the reliability of the reproduced data is comparatively low in the slow-speed reproduction. All the sync block data including those having low reliability allowed by DOS obtained with a low judging threshold are written in the memory, involving a risk that the following undesirable state may be incurred. Namely, all the data fractions detected through repeated trace of the same sync block are over-written upon completion of each traces when the DOS condition is met, regardless of the levels of the envelope of the respective traces. Thus, the data detected through the final trace on the same sync block is used as the final data even when the envelope level of this data is not so high. Consequently, data of comparatively inferior reproduction may be held on the memory, even if data of better quality was obtained in the previous trace.

An embodiment which will now be described is intended to overcome the above-described problem, by a design wherein the data obtained through better tracing is preferentially stored in the memory.

Figure 11:
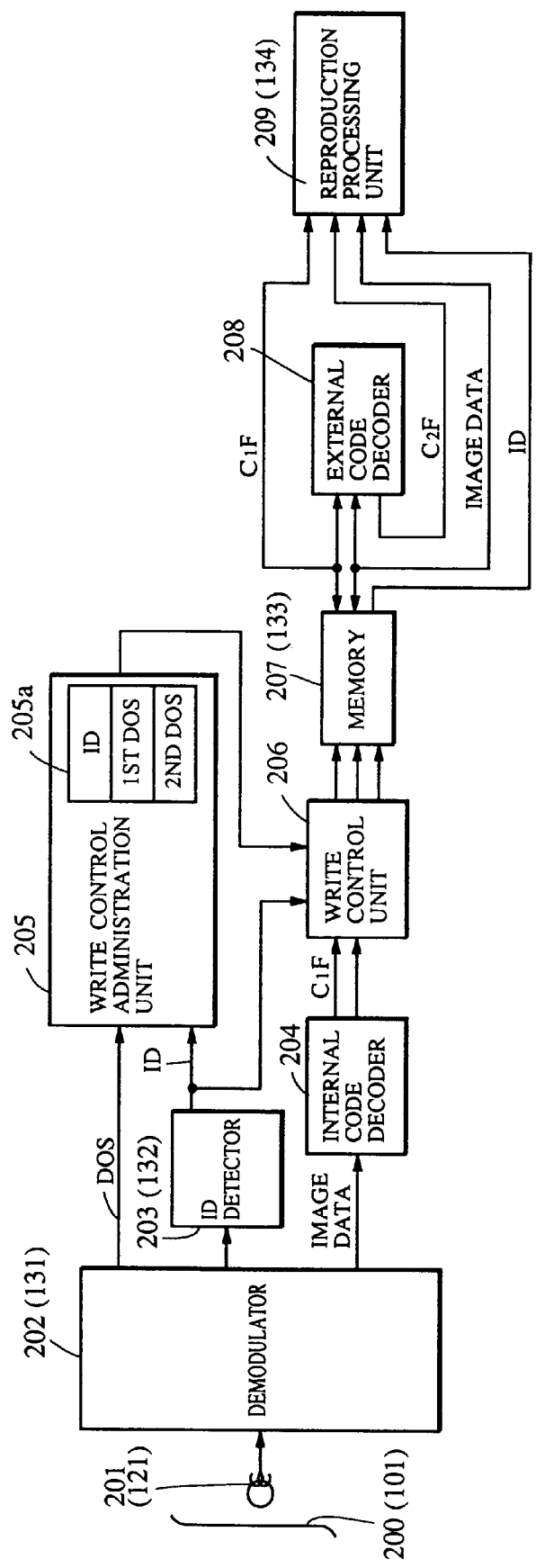
FIG. 11 is a block diagram of a portion of an improvement of the embodiment of the image reproducing apparatus of the present invention.

FIG. 11 illustrates the construction of an image reproducing apparatus as an improved embodiment of the present invention. The embodiment shown in FIG. 11 features a write control administration unit 205 and a write control unit 6 which are added to the components of the preceding embodiment shown in FIG. 3. It is to be noted that the embodiment shown in FIG. 3 employs the internal code decoder 204 and the external code decoder 208, although they are omitted from FIG. 3 for the purpose of clarification of the drawings. In FIG. 11, reference numerals in parenthesis ( ) are the numerals used in FIG. 3 to depict components corresponding to those shown in FIG. 3.

Referring to FIG. 11, the image reproducing apparatus employs a magnetic tape 200, reproducing heads 201, and a demodulator 202 for demodulating data which has been band-compressed in accordance with the transfer characteristic of the magnetic tape, thereby restoring the original data before the recording. The apparatus further has an ID detector for detecting additional information (ID), an internal code decoder 204 which forms a part of an error correction unit, a write control administration unit 205 for determining the control for writing of the data in a later-mentioned memory 207 on the basis of the drop-out signals (DOS) generated in the demodulator 202, a data write control unit 206 for controlling the writing of data based on the drop-out signal (DOS) derived from the demodulator 202, the memory 207 for storing the data, and an external code decoder 208 for effecting correction of external code.

A description will now be given of the decoding operation during slow-speed reproduction performed by this embodiment, with specific reference to FIG. 11. As stated before in connection with FIG. 9, the reproduction heads 201 trace each recording head in overlapping manner. The demodulator 202 transforms the band-limited data detected by the reproducing heads into ordinary digital data through, for example, Viterbi decoding and divides the data into ID data and video data. The video data is delivered to the internal code decoder 204, while the ID data is delivered to the write control unit 206. At the same time, the envelopes of the sync blocks of data detected by the reproducing heads 201 are judged based on plural thresholds, and plural drop-out signals (DOS) are produced corresponding to the plural threshold values. These drop-out signals are output as the control signals for the write control unit 206.

FIGS. 12(a) and 12(b) illustrate examples of the manner in which drop-out signals (DOS) are produced in this embodiment. More specifically, FIG. 12B shows a process in which an envelope detected through one trace in slow-speed reproduction is judged by using first and second thresholds so as to produce a first DOS and a second DOS. FIG. 12(a) is an illustration of an example of the levels of the detection envelope and the states of DOS in plural traces in which a certain sync block data in a track is detectable, as obtained when judgment as shown in FIG. 12(b) is executed. More specifically, FIG. 12(a) indicates that a certain sync block data could be detected in three traces by predetermined slow-speed reproduction and the envelop levels of the detected data in the respective traces were 10%, 60% and 30%. In this embodiment, the first and second thresholds are set to 50% and 20%, respectively. Thus, the envelope obtained through the first trace fails to satisfy the conditions of the first and second DOSes, whereas the envelope obtained through the second trace meets the conditions of both DOSes. The envelope obtained through the third trace satisfies only the condition of the second DOS.

The write control administration unit 205 has a memory 205a for storing the ID data and the first and second DOSes. The memory 205a has a storage capacity which corresponds to the number of all the sync block data which are detected within the period in which the same sync block data is traced in overlapping manner. The write control administration unit 205 determines the write control in accordance with a flow shown in FIG. 13.

In Step S1, the ID data and DOS are input in sync block basis into the write control administration unit 205. In Step S2, plural ID data stored in the memory 205a are successively read. Then, a check is done in Step S3 to determine whether there is any preceding ID data which is the same as the present ID data of the presently input sync block. When there is no previous ID data which would coincide with the present ID data, the process proceeds to Step S4 which determines whether the read-out of previous IDs obtained through all the previous traces has been completed. If the answer is YES, i.e., when reading of all the previous IDs has been finished, the process skips to Step S7, whereas, when the answer is NO, the process returns to Step S2. Therefore, when the present trace is the first trace, the process proceeds to Step S7 since there is no previous ID. Step S7 permits writing of the ID and the video data in the memory 207. In Step S8, the DOS and the ID of the write-enabled data are stored in the memory 205a. In contrast, when accordance of the present ID data with a previous ID data is confirmed in Step S3, the process proceeds to Step S5 which reads from the memory 205a the previous DOS of the same sync block which was stored in response to a previous trace. Then, the read DOS is compared with the present DOS which has just been input in response to the most current trace so as to determine which one of the present DOS and the previous DOS indicates the higher reliability of the data. If the reliability indicated by the previous DOS is equal to or higher than that of the present DOS, the process directly proceeds to Step S9 for sync block processing, without writing the sync block data of the most current trace in the memory 207. However, if the reliability indicated by the present DOS is higher than the previous DOS, Step S9 is executed after execution of Step S7 which writes the sync block data of the most current trace into the memory 207 and Step S8 which writes the present ID and DOS in the memory 205a.

The process described above will be explained with reference to the diagram shown in FIGS. 12(a) and 12(b). The envelope of the data obtained through the first trace does not meet the conditions of the first DOS and the second DOS. In this case, however, writing of the read data in the memory 207 is permitted because there is no previous trace, i.e., because the same sync block has not been detected in the past. Minimal data are thus preserved. The envelope obtained through the second trace meets the conditions of both DOSes. In this case, the DOS information which has been obtained through the first trace is read as the DOS information of the same sync block data which was previously written in the memory 205a. The thus-read DOS information is compared with the DOS information of the second trace. As a consequence, the data obtained through the second trace is determined as having higher reliability than the data obtained through the first trace. The writing of the data of the second trace into the memory 207 is therefore permitted. At the same time, the DOS and the ID of the data of the second trace are stored in the memory 205a. The data obtained through the third trace satisfies only the condition of the second DOS. Comparison of the DOS information of this data with the DOS information of the second trace shows that the reliability of the data obtained through the third trace is lower than that of the data obtained through the second trace. Therefore, the writing of the data of the third trace into the memory 207, as well as the writing of the DOS and ID into the memory 205a, is prohibited.

The internal code decoder 204 conducts the internal code decoding of the video data, while the described process is being conducted in the write control administration unit 205. The internal code decoder 204 then delivers to the write control unit 206 the video data after the correction and the flag information $C_1F$ which indicates whether or not the video data contains any error.

The write control unit 206 controls the writing of the flag information $C_1F$, video data and the ID data into the memory 207, in accordance with the control signal from the write control administration unit 205. More specifically, the writing of these data in the memory 207 is executed when the control signal from the write control administration unit 205 is an OK signal which indicates that these data are reliable, whereas, when the control signal is an NG signal which indicates that these data are not reliable, the writing in the memory is prohibited. The memory 207 is a RAM and the appointment of addresses in this RAM is conducted in accordance with the ID data which indicates the position of the display of the data on the display frame.

The video data stored in the memory 207 are rearranged in the order of the external code and are input to the external code decoder 208. The external code decoder 208 performs a correction processing similar, referring to the flag information $C_1F$, to that in the internal code correction, and the data after the correction are stored in the memory 207 with flag information $C_2F$ which indicates an impossibility of further external code correction. After the completion of the external code correction performed by the external code decoder 208, the ID data, flag information $C_1F$, $C_2F$ and the corrected video data acquired in the memory 207 are sent to the reproduction processing unit 209, which performs interpolation using the flag information $C_1F$, $C_2F$.

In the slow-speed reproduction mode of the apparatus, the same sync block is repeatedly detected through plural traces which provide different envelope levels, i.e., different levels of reproduction quality. This poses a risk that, if the sync block data is updated in response to each trace, sync block data of a comparatively inferior quality may be left in the memory as the final data. This problem, however, is eliminated in the described embodiment because the quality of the sync block data is evaluated in terms of the DOS obtained by checking the envelope level with reference to predetermined thresholds so that the sync block data reproduced in the best trace is preserved in the memory 207.

Although two threshold levels are used in for the production of the DOS in the described embodiment, it is possible to use three or more threshold levels.

Figure 14:
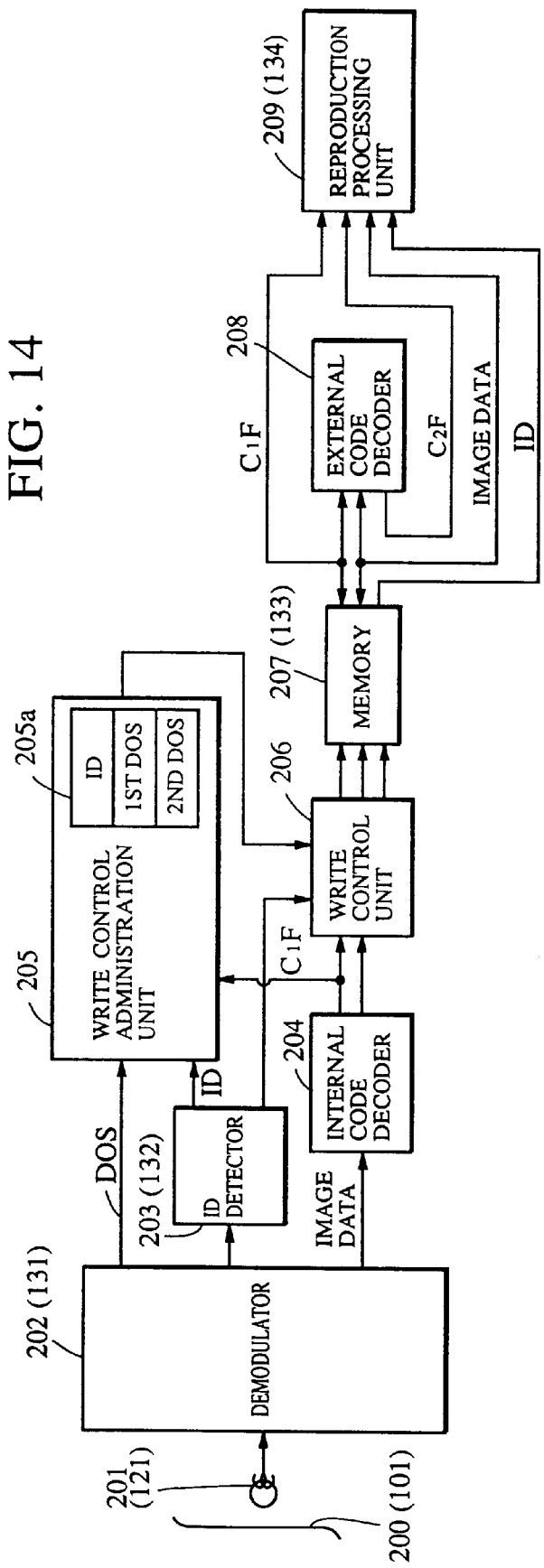
FIG. 14 is a block diagram of a portion of another improvement of the image reproducing apparatus shown in FIG. 11.

FIG. 14 illustrates a different embodiment which is a further improvement in the arrangement shown in FIG. 11. This embodiment is characterized in that the flag output $C_1F$ of the internal code decoder 204 is also given to the memory 205a of the write control administration unit 205 so that data containing no error is preferentially held in the memory 207.

Figure 13:
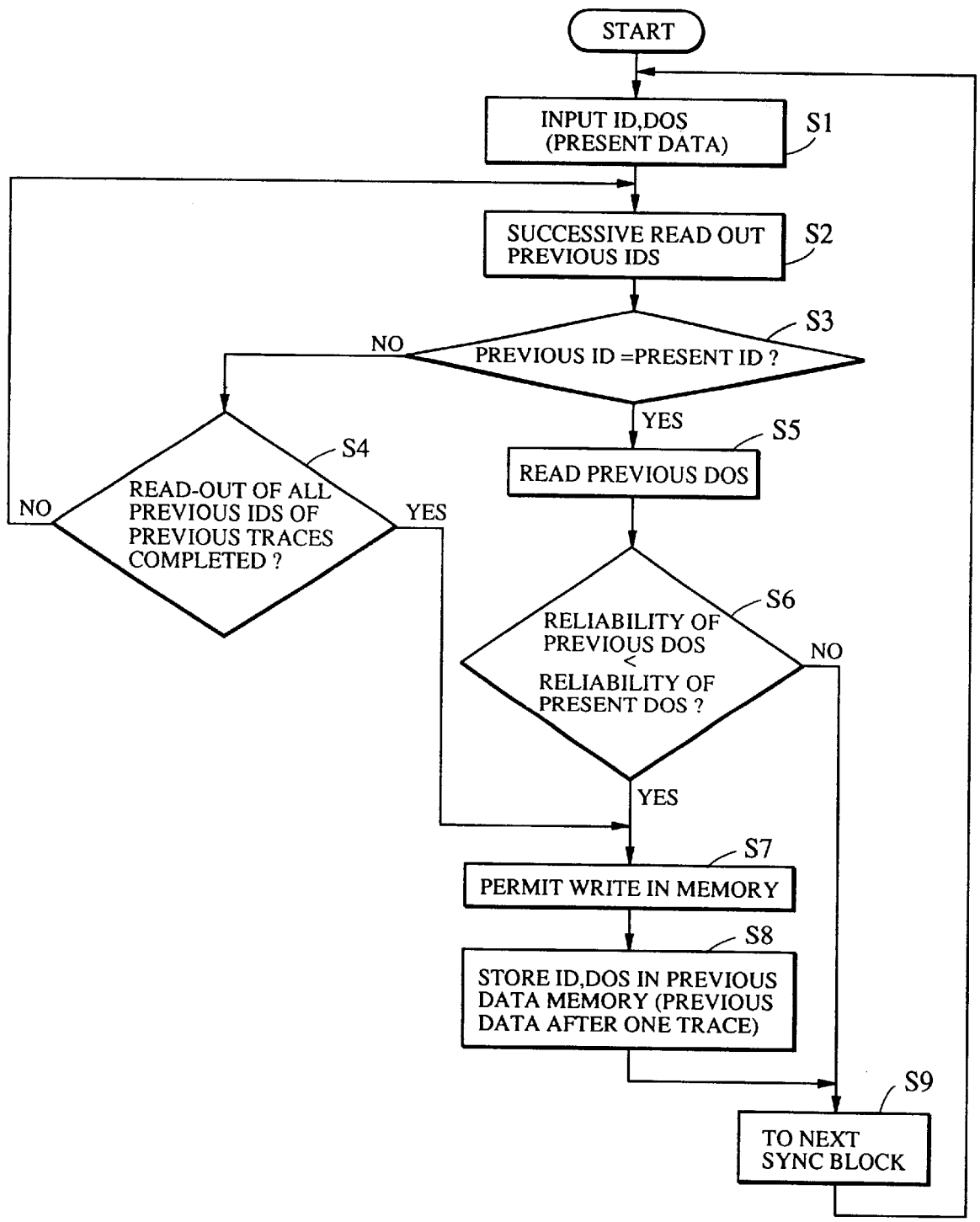
FIG. 13 is flowchart illustrative of a slow-speed reproducing operation of an improvement of the image reproducing apparatus shown in FIG. 11.

FIG. 15 is a flow chart illustrative of the operation of the write control administration unit 205 in this embodiment. Steps of this process which are equivalent to those in the flow shown in FIG. 13 are denoted by the same Step No. as those in FIG. 13, and further description of such steps is omitted, In this embodiment, Steps S10, S11 and S12 are inserted after Step S3 of the flow of FIG. 13.

In Step S3, any ID data which would coincide with the present ID data are searched. If a previous ID data coinciding with the present ID is found, the process proceeds to Step S10 which reads the flag information $C_1F$ corresponding to such a previous ID data from the memory 205a. If the flag information $C_1F$ shows that the previous data written in the memory 207 contains no error, the process terminates processing on this sync block and skips to Step S9 which executes processing for the next sync block. Conversely, if the flag information $C_1F$ indicates that the corresponding previous data written in the memory 207 contains an error, the process proceeds to Step S12 which determines whether or not the presently obtained data contains any error, based on the present flag information $C_1F$. If the present data is determined as containing no error, the process proceeds to Step S7 which permits writing of the present data in the memory 207 and further to Step S8 in which the data in the memory 205a is updated with the present DOS and CiF. Conversely, if the present flag information $C_1F$ indicates that the present data contains an error, Steps S5 and S6 are executed to conduct a judgment based on the drop-out signals (DOS) in a manner similar to that performed in the flow shown in FIG. 13.

It is assumed by way of example that the envelope levels of 25% and 35%, respectively, have been obtained through the first and second traces, while the first and second threshold levels for determining the DOS have been set to 40% and 20%, respectively, so that the data obtained through the first trace is judged as containing an error while the data obtained through the second trace is judged as containing no error. In such a case, the data obtained through the second trace is written in the memory. This should be contrasted to the write control performed in the embodiment shown in FIG. 11 which, in the above-described case, skips to the processing of the next sync block without conducting writing of data in the memory 207. Thus, the embodiment shown in FIG. 14 provides a more delicate data writing control than the embodiment shown in FIG. 1.

Thus, the embodiments described in connection with FIGS. 11 and 14 make it possible to hold in the memory the data of higher reproduction quality, through determination of the DOS by employing two or more threshold levels and comparison of the DOS of the most current trace with the previous DOS, whereby the quality of image during slow-speed reproduction is improved.

In particular, the embodiment shown in FIG. 14 ensures that data of a better quality of reproduction is held in the memory, through the comparison between the DOS and the internal code decoding flag information of the most current trace with the DOS and error-correcting decode flag information of a previous trace. Thus, a more delicate data writing control is performed to further improve the image quality in slow-speed reproduction.

The individual components shown in outline are designated by blocks in the Drawings are all well-known in the image recording/reproducing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications an equivalent structure and functions.

What is claimed is:

1. A recording and/or reproducing apparatus for (i) recording in a recording mode and/or (ii) reproducing in a reproducing mode, digital information to and/or from a recording medium which stores digital information and address data, comprising:

recording medium moving means for moving the recording medium in a plurality of modes including the recording mode, the reproducing mode, and a slow-motion reproducing mode, said recording medium moving means moving the recording medium intermittently in the slow-motion reproducing mode, the intermittent movement including a movement period during which the recording medium is fed and a rest period during which the recording medium is still, wherein said recording medium moving means moves the recording medium at a constant speed which is slower than a feeding speed of the recording medium in the recording mode during the intermittent movement of the recording medium in the slow-motion reproducing mode;

reproducing means for reproducing digital information recorded in a plurality of sequential blocks of the recording medium during each movement period as the recording medium is fed at the constant speed slower than the feeding speed, and for obtaining a plurality of sequential portions of reproduced data; and synthesizing means for synthesizing the plurality of sequential portions of reproduced data in accordance with the address data stored on said recording medium and for providing synthesized reproduced information.

2. Apparatus according to claim 1, wherein said recording medium moving means moves the recording medium in the reproducing mode at a speed which is 1/N the speed of movement of the recording medium in the recording mode, where N is an integer.

3. Apparatus according to claim 1, wherein said synthesizing means further comprises storage means for storing the plurality of portions of reproduced data and in which the plurality of portions of reproduced data are assembled to synthesize the reproduced information.

4. Apparatus according to claim 3, further comprising:

signal generating means for generating signals indicative of predetermined error states of the plurality of portions of reproduced data;

comparator means for comparing the signals generated by said signal generating means with one another; and control means for controlling the storage of the plurality of portions of reproduced data in said storage means in accordance with the result of the comparison performed by said comparator means.

5. Apparatus according to claim 4, further comprising:

error correcting means for correcting errors in the reproduced data, and for generating additional data when error correction is not possible.

6. Apparatus according to claim 5, wherein said storage means stores the reproduced data corrected by said error correcting means.

7. Apparatus according to claim 6, further comprising additional data comparing means for comparing a plurality of additional data which are reproduced by said error correcting means in accordance with the plurality of portions of reproduced data.

8. A reproducing apparatus, comprising:

reproducing means for reproducing digital data, including digital image data and digital address data corresponding to the digital image data, from a recording medium;

moving means for moving the recording medium;

storing means for storing the reproduced digital image data according to the digital address data reproduced by said reproducing means; and mode setting means for setting a mode of the reproducing apparatus among a plurality of modes, the plurality of modes including a normal reproduction mode during which said moving means moves the recording medium at a first speed corresponding to a recording speed at which the recording medium is moved during recording of the digital data, and during which said reproducing means reproduces the digital image data and the digital address data from the recording medium, and a slow-motion reproduction mode during which said moving means intermittently moves the recording medium, the intermittent movement including a movement period during which said moving means moves the recording medium at a constant speed which is slower than the recording speed and during which said reproducing means reproduces the digital image data and the digital address data from the recording medium, and a rest period during which said moving means stops moving the recording medium.

9. A reproducing apparatus according to claim 8, wherein said storing means stores the reproduced digital image data in the normal mode and the intermittent mode.

10. A reproducing apparatus according to claim 8, wherein the digital data includes a plurality of sync-blocks each of which includes the digital image data, the address data and sync-data.

11. A reproducing apparatus according to claim 10, further comprising error correction means for correcting errors in the digital image data for each of the plurality of sync-blocks, wherein said storing means is prevented from storing errors which cannot be corrected by said correction means.

12. A reproducing apparatus according to claim 8, wherein said storing means stores the digital image data corresponding to a plurality of frames.

13. A reproducing apparatus according to claim 12, wherein the digital image data corresponding to one of the plurality of frames is recorded on a plurality of tracks formed on the recording medium.

14. An apparatus according to claim 8, further comprising:

decoding means for decoding the reproduced digital image data reproduced from said storing means; and frame memory means for storing the reproduced digital image data decoded by said decoding means.

15. An apparatus according to claim 8, further comprising tracking control means for generating a tracking control signal according to the reproduced digital image data and for outputting the tracking control signal to said moving means, said moving means moving the recording medium according to the tracking control signal.

16. An apparatus according to claim 8, wherein said moving means comprises pulse generating means for generating pulse signals corresponding to a moving speed of the recording medium and said moving means moving the recording medium in accordance with the pulse signals.

17. An apparatus according to claim 8, further comprising an operation key for instructing said mode setting means to set the mode of the reproducing apparatus according to an instruction.

18. A reproducing apparatus, comprising:

reproducing means for reproducing digital data, including digital image data and digital address data corresponding to the digital image data, from a recording medium;

moving means for moving the recording medium;

storing means for storing the reproduced digital image data according to the digital address data reproduced by said reproducing means; and mode setting means for setting a mode of the apparatus among a plurality of modes, the plurality of modes including a normal reproduction mode, during which said moving means moves the recording medium at a first speed, and a slow-motion reproduction mode during which said moving means intermittently moves the recording medium, the intermittent movement including (i) a moving period during which said moving means moves the recording medium at a constant speed which is slower than the first speed and said reproducing means reproduces the digital image data and the digital address data of a predetermined number of frames, and (ii) a still period during which said moving means stops moving the recording medium.

19. A reproducing apparatus according to claim 18, wherein said storing means stores the reproduced digital image data in the normal reproduction mode and the intermittent reproduction mode.

20. A reproducing apparatus according to claim 18, wherein the digital data includes a plurality of sync-blocks each of which includes the digital image data, the digital address data and sync-data.

21. A reproducing apparatus according to claim 20, further comprising error correction means for correcting errors in the digital image data for each of the plurality of sync-blocks, wherein said storing means is prevented from storing errors which cannot be corrected by said error correction means.

22. A reproducing apparatus according to claim 13, wherein said storing means stores the digital image data corresponding to a plurality of frames.

23. A reproducing apparatus according to claim 22, wherein the digital image data corresponding to one of the plurality of frames is recorded on a plurality of tracks formed on the recording medium.

24. A reproducing apparatus, comprising:

reproducing means for reproducing digital data, including digital image data and digital address data corresponding to the digital image data, from a recording medium;

moving means for moving the recording medium;

storing means for storing the reproduced digital image data according to the digital address data reproduced by said reproducing means; and mode instructing means for providing an instruction for a slow reproduction mode during which said moving means intermittently moves the recording medium for slow speed reproduction, the intermittent movement including (i) a movement period during which said moving means moves the recording medium and said reproducing means reproduces the digital image data and the digital address data from the recording medium, and (ii) a still period during which said moving means stops moving the recording medium, wherein, during the movement of the recording medium in the slow reproduction mode, said moving means moves the recording medium at a constant speed which is slower than a speed at which the recording medium is moved in recording of the digital data.

25. An apparatus according to claim 24, wherein said mode instructing means includes an operation key for entering instructions corresponding to the slow reproduction mode.

* * * * *

UNITED STATES PATENT AND TRADEMARK OFFICE
CERTIFICATE OF CORRECTION

PATENT NO.    : 6,243,529 B1
DATED         : June 5, 2001
INVENTOR(S)   : Nobutoshi Takayama et al.

It is certified that error appears in the above-identified patent and that said Letters Patent is hereby corrected as shown below:

Column 1,
Line 5, "continuation," should read -- continuation --;
Line 38, "tacking" should read -- tracking --; and
Line 41, "pick-up" should read -- pick up --.

Column 2,
Line 14, close up right margin;
Line 15, close up left margin; and
Line 45, "provide" should read -- provided --.

Column 3,
Line 4, "mans" should read -- means --; and
Line 23, "data n" should read -- a data --.

Column 10,
Line 61, "envelop" should read -- envelope --.

Column 13,
Line 19, "CiF." should read -- $C_1F.$ --; and
Line 54, "Drawings" should read -- drawings --.

Column 16,
Line 32, "claim 13," should read -- claim 18, --.

Signed and Sealed this

Second Day of April, 2002

Attest:

*Attesting Officer*

JAMES E. ROGAN
*Director of the United States Patent and Trademark Office*